United States Patent [19]

Golownia

[11] Patent Number: 5,130,351

[45] Date of Patent: Jul. 14, 1992

[54] EPOXY-AMINE COATINGS WITH TRICARBOXYLIC ACID THIXOTROPIC ADDITIVE

[75] Inventor: Robert F. Golownia, Northfield, Ohio

[73] Assignee: The Glidden Company, Cleveland, Ohio

[21] Appl. No.: 472,010

[22] Filed: Jan. 30, 1990

Related U.S. Application Data

[62] Division of Ser. No. 316,700, Feb. 28, 1989, Pat. No. 4,937,296.

[51] Int. Cl.$^5$ ................................................. C08K 5/09
[52] U.S. Cl. ...................................... 523/455; 525/423; 525/420.5; 525/523; 528/111.3; 528/113; 528/118; 528/121; 528/123
[58] Field of Search ............... 525/423, 533, 420.5, 525/523; 523/455; 528/111.3, 113, 118, 121, 123

[56] References Cited

U.S. PATENT DOCUMENTS

| | | | |
|---|---|---|---|
| 4,009,223 | 2/1977 | Noonan | 523/400 |
| 4,451,591 | 5/1984 | Kozak et al. | 523/457 |
| 4,914,145 | 4/1990 | Tohdoh et al. | 524/368 |

*Primary Examiner*—Robert E. Sellers
*Attorney, Agent, or Firm*—Thomas M. Schmitz

[57] ABSTRACT

Curable epoxy-amine coatings comprised of pigmented mixtures of reactive amine-functional curing agents and epoxy resins are substantially improved by being rendered thixotropic or pseudoplastic by the inclusion of at least about 0.05% by weight of a thixotropic additive selected from monocarboxylic organic acid, dicarboxylic organic acid, tricarboxylic organic acid, fatty acid or polymerized fatty acid.

3 Claims, No Drawings

EPOXY-AMINE COATINGS WITH TRICARBOXYLIC ACID THIXOTROPIC ADDITIVE

This is a division of application Ser. No. 316,700, filed Feb. 28, 1989, now U.S. Pat. No. 4,937,296.

BACKGROUND OF THE INVENTION

This invention pertains to non-aqueous thermosetting epoxy-amine protective coatings and particularly to the inclusion of additive amounts of organic acids to provide thixotropic or pseudoplastic characteristics to the coating.

The rheological or flow properties of liquid organic protective coatings are generally designed to provide a controlled degree of non-dripping, non-sagging or non-running behavior such that after application to a vertical surface by spraying or brushing, a uniform thickness of coating is maintained on the vertical surfaces without dripping, etc. while the coating dries or cures to a hard film At the same time, however, it is also necessary that the liquid coating have sufficiently low viscosity so that it may be easily atomized by spraying or spread over a surface by brushing or rolling. Such rheological behavior where a viscous coating displays a lower viscosity when sheared by spraying or brushing in known as pseudoplasticity or more commonly as thixotropy. Pseudoplastic/thixotropic coatings possess the desirable characteristic of sufficiently high viscosity and resistance to dripping or sagging after being applied to a vertical surface but will exhibit a lower viscosity when sheared during the course of spraying or brushing such that atomization and spreading may be accomplished without undue effort.

Liquid organic coatings, including epoxy-amine coatings ordinarily are rendered thixotropic/pseudoplastic through the inclusion of certain particulate materials such as fumed silica, treated bentonite clays, or hydrogenated castor waxes. Pigmented epoxy-amine coatings where the epoxy resin and amine curing agent are mixed immediately before use are often formulated to contain such particular materials to provide resistance to sagging or dripping from vertical surfaces while maintaining good atomizing and brushing properties. However, such particulate materials are costly and require considerable care and energy to disperse into an organic coating. Illustrative comparative examples of these prior suggestions appear in the examples hereinafter.

Thermosetting epoxy-polyamide coatings are disclosed in U.S. Pat. No. 4,771,088 where the coating contains above about 1% by weight of a cationic stabilizing additive comprising an ethoxylated quaternary ammonium chloride salt based on the weight of the epoxy-polyamide polymeric solids. This patent teaches that viscosity and sag resistance are maintained during the catalyzed pot life of the coating when the two-component epoxy resin and polyamide are mixed together.

It now has been found that a thermosetting epoxy-amine protective paint coating containing minor amounts of an organic acid renders the coating thixotropic or psuedoplastic to enable brushing, rolling or spraying of the coating with minimum applied shear force. Expensive fumed silica or Bentone clays are avoided. In accordance with this invention, the inclusion of at least 0.05% by weight of an organic acid to the epoxy-amine coating provides the necessary thixotropic properties. Pigmented epoxy-amine coatings can be formulated to be pseudoplastic/thixotropic and relatively easy to manufacture at lower cost through the inclusion of the minor amount of organic acid and preferably fatty acid or polymerized fatty acid. Such modified coatings exhibit good spraying and brushing behavior while also resisting sagging and dripping when applied to vertical surfaces. Sag resistance of paints can be measured by ASTM D4408-84. Thixotropic properties can be measured by ASTM D4400-84. Thixotropic this invention will become more apparent from the detailed description of the invention and the illustrative examples.

SUMMARY OF THE INVENTION

Briefly, the invention is directed to a protective coating or paint coating based on a polymeric binder composition comprising a thermosetting epoxy-amine binder containing at least about 0.05% by weight of an organic acid, preferably a fatty acid or fatty acid derivative, to provide a pseudoplastic coating.

DETAILED DESCRIPTION OF THE INVENTION

The invention pertains to a thermosetting protective coating exhibiting thixotropic properties and comprising an epoxy amine polymeric binder where the coating contains an additive amount of thixotropic additive based on an organic acid, especially a fatty acid or fatty acid derivative. Referring first to the thixotropic additive, suitable organic acids are aromatic or aliphatic carboxylic acid functional compounds, such as benzoic acid and acetic acid including branched chains in some compounds, saturated or different degrees of unsaturation, and can be derived from fats and oils. The fatty acids can be obtained from animal tallows and greases, vegetable, coconut, tall oil, palm, as well a produced synthetically from petroleum sources by oxidation of hydrocarbons. Naturally occurring fatty acids include for example, caproic, enanthic, caprylic, pelargonic, capric, lauric, myristic, palmitic, stearic, arachidic, behenic, and tetracosanoic. Odd number carbon fatty acids, although uncommon, can be synthesized by hydrolysis of the appropriate carbon chain nitriles. Dicarboxylic acids are very useful, including, for instance, malonic acid, succinic acid, glutaric acid, adipic acid, pimelic acid, suberic acid, azelaic acid, sebacic acid, as well as higher aliphatic decarboxylic acids. Useful tricarboxylic acids include trimellitic acid and trimesic acid. Useful fatty acid derivatives include polymerized fatty acids which include dimerized and trimerized aliphatic fatty acids resulting in compounds having dicarboxylic and tricarboxylic acid functionality. Dimer fatty acids typically are C12 dicarboxylic acids, 9- and 10-carboxystearic acids, and C19 dicarboxylic acids reaction products typically resulting from reactions of C18 unsaturated fatty acids produced, for example, by self-condensation or by a Diels-Alder reaction with acrylic acid or by reaction with carbon monoxide followed by oxidation of the 9- or 10- formystearic acid or, alternatively, by hydrocarboxylation of the unsaturated fatty acid. The starting materials for the dimerization reactions usually are tall oil fatty acid or oleic acid although other unsaturated fatty acid raw materials can be utilized. For instance, dimerization of fatty acids by dehydrogenation using a free radical peroxide initiator is applicable to nonconjugated and monounsaturated olefins as well as occasionally with fully saturated fatty acids. Methyl stearate or methyl oleate can be dimerized under head and in the presence of peroxide catalysts to provide coupling at the C8, C9, C10 and C11 carbon atoms. Linoleates and linolenates provide similarly coupled dimer acids. In accordance with this invention, ate least about 0.05% and preferably between 0.1% and 0.5% fatty acid derivative by weight based on the epoxy-amine polymeric binder is added to provide the desired thixotropic or pseudoplastic properties in the resulting paint coating.

Referring next to epoxy resins useful in the epoxy-amine polymer mixture, epoxy resins are polyglycidyl ethers of bisphenol A, especially those having 1,2-epoxy equivalency of from about 1.3 to about 2. The molecular weight should be from about 350 to about 10,000, preferably from 380 to 1,000. Molecular weights can be measured by GPC (gel permeation chromatography). Although high molecular weight commercial epoxy resins are sometimes convenient to use, a more practical method is to start with bisphenol A and the diglycidyl ether of bisphenol A, whereby the molecular weight of a liquid epoxy resin can be increased to a level that is more satisfactory for many coating applications by reacting liquid epoxy resin with additional bisphenol A or other polyalcohol materials.

The epoxy resin, ordinarily can be a mixture of monoepoxide and diepoxide. The epoxy polymer can be conventional epoxy polymers produced by a condensation reaction of epichlorohydrin or dichlorohydrin with bisphenols or polyhydric phenols, polyalcohols, polyfunctional halohydrins, and certain polyepoxides. The preferred epoxy polymers are produced by coreacting epichlorohydrin or dichlorohydrin with bisphenol-A to provide linear expoxy polymers having pendant epoxide groups. The most preferred epoxy polymers are epichlorohydrin reacted with bisphenol-A. The epoxy polymer can contain between 1 and 25 monomer units and preferably between 1 and 4 copolymerized monomer units (bispenol-A) wherein the resulting epoxy polymer preferably a diepoxide polymer adapted to coreact with polyamide resin in a catalyzed thermosetting mixture.

The epoxy resin can be combined with amines or preferably with polyamides in accordance with this invention. Curable epoxy-amine or epoxy amide coatings ordinarily are prepared as two separate coreactive components which are then mixed together just prior to use. After mixing, a chemical reaction occurs between the two components which leads to gellation and eventual cure of the mixture. Commonly, aliphatic polyamines such as ethylene diamine, diethylene triamine, triethylene tetramine, 1,6-hexane diamine, 2-methylpentamethyulene diamine etc. are used as the reactive portion of one component while an epoxy resin produced by the reaction of epichlorohydrin and bisphenol-S is used as the reactive portion of the second component. In place of aliphatic polyomines, reaction products of excess aliphatic polyamine with fatty acids are also suitable as the reactive portion of the first component. These materials are known as polyamidoamines. Useful diamines include, for example, ethylenediamine, diethylenetriamine, triethylenetetramine, tetraethylenepentamine, pentaethylenehexamine, aminoethylpiperazine, piperazine, propylenediamine, 1,3-diaminopropane, iminiobispropylamine, dimethylaminopropylamine, menthanediamine, triethylenediamine, N,N,N'N-tetramethylethylenediamine, N,N,N',N'-tetramethyl-1,3-butanediamine, and hexamethylenediamine.

Referring next to reactive polyamide resins, reactive polyamides are low molecular polymers containing reactive amino groups adapted to be activated and become coreactive with epoxy resin. Polyamides are polycondensation products wherein the recurring or linking unit is the amide grouping -CONH-. Many methods of producing reactive polyamides are known although most methods are based on a dehydration reaction occurring between organic carboxylic acid and amine upon heating. For instance, heating a simple dicarboxylic acid with slight excess equivalents of a simple aliphatic diamine produces substantially a linear reactive polyamide. A similar reaction can occur between monoamines and dicarboxylic acid, monocarboxylic acids and diamines, and between di- or polyamines and di- or polybasic acids. Sufficient aliphatic chains between functional groups promotes polymer formation. A wide variety of polyamides are possible since these can be based on a wide variety of polyamines and polybasic acids as well as mixtures of two or more of these essential reactants. Modifications are possible in functionality as well as in number of reactants, and in addition polyamides, linear or branched, can be effectively chain-terminated by any one of a large number of monobasic acids or monoamines. The end groups in polyamide resins suitable for coreaction with epoxy resins are generally amine groups. In synthesizing polyamide resins, the reaction can be carried out in a stainless steel vessel fitted with an inert gas line, agitator and condenser. By heating in an atmosphere of nitrogen with constant agitation, water of reaction is evolved first, for example, from ethylene diamine solution and then, as the temperature rises, from the dehydration reaction itself. Heating is continued until the temperature approaches 200° C., water being allowed to escape through the condenser. As the product becomes resinous it is checked at intervals until the desired acid value, amine number and viscosity have been reached whereupon the resulting polyamide resin can be thinned with an organic solvent if necessary to provide a fluid resin material. Polyamides useful in thermosetting compositions preferably contain at least two reactive amine groups per polymer molecule to facilitate crosslinking. Suitable polyamides typically have molecular weight up to about 10,000 and preferably between 100 and 5,000. The polyamine number (value) desirably is between 75 and 750 mg koh/gm. The free amine groups in the condensed polyamide resin provide crosslinking sites for catalytic coreaction with epoxy resin. Polyamide resin, especially those containing a branched chain structure and multiplicity of primary amino end groups are particularly useful in a crosslinking reaction with epoxy resin.

A wide range of weight ratios of diamine or polyamide resins to epoxy resin can be utilized and advantageously can range between 10% and 75% diamine or polyamide combined with 90% and 25% by weight of epoxy resin. On a weight basis, the preferred binder for the coating composition of this invention comprises between 75% and 40% epoxy resin, between 25% and 60% polyamide resin, and at least 0.05% organic acid prefererably fatty acid derivative. Preferred binder compositions comprise between 65% and 40% epoxy resin, between 35% and 60% polyamide resin, and between 0.1% and 0.5% fatty acid derivative.

The epoxy-polyamide compositions can be pigmented by grinding pigments into either or both the epoxy and polyamine resins. Useful pigments can ordinarily include opacifying pigments such as titanium dioxide, zinc oxide, leaded zinc oxide, titanium calcium, as well as tinting pigment such as carbon black, yellow oides, brown oxides, tan oxides, raw and burnt sienna or umber, chromium oxide green, phthalocyanine green, phthalonitrile blue, ultra-marine blue, cadmium pigments, chromium pigments, and the like. Filler pigments such as clay, silica, talc, mica, wolastonite, wood flouer and the like can be added.

The advantages of this invention are illustrated in the following examples.

EXAMPLE 1

A series of pigmented polyamidoamine bases were prepared to illustrate the relative effectiveness of fumed silica and an organic acid to render an epoxy coating thixotropic. After the bases were prepared by blending the first eight materials listed in the table below in a high speed disperser using conventional practice known to those skilled in the art, the bases were mixed with 78.22 weight parts of a coreactive "curing agent" prepared from a solution of a commercially available bisphenol-A epoxy resin and allowed to stand for thirty minutes before measuring Leneta sag resistance and Thixotropic Index.

| Formula | Polyamidoamine Bases (parts by weight) | | | | | |
|---|---|---|---|---|---|---|
| | A | B | C | D | E | F |
| Polyamidoamine[1] | 28.47 | 28.47 | 28.47 | 28.47 | 28.47 | 28.47 |
| Titanium Dioxide | 28.59 | 28.59 | 28.59 | 28.59 | 28.59 | 28.59 |
| Toluene | 20.49 | 20.49 | 20.49 | 20.49 | 20.49 | 20.49 |
| Talc | 13.92 | 13.92 | 13.92 | 13.92 | 13.92 | 13.92 |
| Isopropanol | 7.89 | 7.89 | 7.89 | 7.89 | 7.89 | 7.89 |
| Accelerator[2] | 0.64 | 0.64 | 0.64 | 0.64 | 0.64 | 0.64 |
| Fumed Silica[3] | 0.00 | 2.32 | 0.00 | 0.00 | 0.00 | 0.00 |
| Dimer Acid[4] | 0.00 | 0.00 | 0.28 | 0.55 | 0.83 | 1.10 |
| Epoxy Curing Agent[5] | 78.22 | 78.22 | 78.22 | 78.22 | 78.22 | 78.22 |
| Leneta Sag (mils)[6] | 7 | 12 | 14 | 18 | 20 | 20 |
| Thixotropic Index[7] | 1.06 | 2.34 | 2.50 | 3.32 | 3.11 | 3.22 |

[1]Versamid 115 X-70 produced by the Henkel Corporation.
[2]2,4,6-Tris(dimethylaminomethyl) phenol.
[3]Cabosil M-5, Cabot Corporation.
[4]Empol 1010, Emery Industries.
[5]A mixture prepared by blending:
Epon 1001-HT-70, Shell Chemical-69.40 wt. parts
Isobutyl acetate-16.73 wt. parts
Toluene-5.21 wt. parts
Aromatic solvent 100-4.84 wt. parts
Urea formaldehyde resin-3.51 wt. parts
Cellulose acetate butyrate-0.32 wt. parts
[6]ASTM standard test method for sag resistance of paints using a multinotch applicator, D 4400-84.
[7]ASTM standard test method for rheological properties of non-Newtonian materials by rotational (Brookfield) viscometer, D2196-81, Method B-14.2.1, 10/100 RPM.

Comparing the Leneta Sag of formulas A and B shows the increase in sag resistance and thixotropic index obtained by the inclusion of fumed silica as prescribed by the prior art. Inclusion of small amounts dimer acid in place of fumed silica in formulas C thru F shows how even greater levels of sag resistance can now be obtained. It should be noted too, that formulas containing fumed silica develop a significant level of thixotropy before the high speed dispersion process is totally completed which in turn hampers the mixing the dispersion of the remaining paint components. In formulas containing dimer acid as the thixotropy inducing component, Newtonian (non-thixotropic) rheology which is known to promote relatively easy mixing and dispersion of the remaining paint components can be maintained until the operator adds the dimer acid. Therefore, the process may be adjusted to maximize processing efficiency by maintaining Newtonian rheology for good mixing and dispersion of the pigments and resins and then finally developing the desirably level of thixotropy by simply stirring in the acid component. This is unlike fume silica which itself requires intensive mixing and dispersion to develop thixotropy and therefore causes difficulty with the incorporation of the remaining ingredients of the coating.

EXAMPLE 2

Quantities of an acid-free polyamidoamine base having the composition of base A for Example 1 above were modified by adding small amounts of various acids and then mixed with an equal volume of the epoxy curing agent also described in Example 1. After being allowed to stand for thirty minutes, the coatings were evaluated for Leneta sag resistance and thixotropic index following the same procedure as used in Example 1:

| Acid | Acid Amount (% of Base A) | Leneta Sag Resistance | Thixotropic Index |
|---|---|---|---|
| Acid-free Standard | 0.00 | 7 | 1.32 |
| Dimer[1] | 0.28 | 14 | 3.08 |
| Dimer[1] | 0.55 | 18 | 3.26 |
| Glacial acetic | 0.28 | 10 | 1.79 |
| Glacial acetic | 0.55 | 9 | 1.91 |
| Oleic | 0.28 | 8 | 1.90 |
| Oleic | 0.55 | 10 | 2.63 |
| 85% Lactic | 0.28 | 9 | 2.15 |
| 85% Lactic | 0.55 | 10 | 2.52 |
| Butyl phosphoric | 0.28 | 9 | 1.95 |
| Butyl phosphoric | 0.55 | 8 | 2.03 |
| Trimer[2] | 0.28 | 14 | 3.19 |
| Trimer[2] | 0.55 | 18 | 3.45 |
| Tall oil fatty acid | 0.28 | 9 | 2.00 |
| Tall oil fatty acid | 0.55 | 10 | 2.75 |
| 30% Benzoic soln.[3] | 0.28 | 7 | 1.55 |
| 30% Benzoic soln.[3] | 0.55 | 6 | 1.55 |

[1]Empol 1010, Emery Industries.
[2]Empol 1040, Emery Industries.
[3]Solution of 30% by weight of Benzoic acid in ethanol.

The data contained in Example 2 clearly show that the addition of any of a number of acids to an amine-epoxy coating produces a desirable increase in the Lenta Sag Resistance and Thixotropic Index. Dimer and Trimer acids appear to be the most effective over a wide range of concentrations.

I claim:

1. A thermosetting, thixotropic, liquid protective coating composition containing a polymeric binder comprising a coreactive mixture of an epoxy resin and a crosslinking amine component selected from an aliphatic polyamine, a polyaminoamide or a reactive amino group-containing polyamide resin other than said polyaminoamide, the improvement comprising on a weight basis:
the polymeric binder containing between 10% and 75% of an epoxy resin and between 25% and 90% of said crosslinking amine compound, where said binder contains at least 0.05% and up to 0.5% by weight of a thixotropic additive of a tricarboxylic organic acid to provide thixotropic characteristics to said paint coating.

2. The coating composition of claim 1 where the thixotropic additive is added at the level between 0.1% and 0.5% based on the weight of the binder polymers.

3. The coating composition in claim 1 were the polymeric binder comprises by weight 40% and 65% epoxy resin and between 35% and 60% reactive amino group - containing polyamide resin, and between 0.1% and 0.5% trixotropic additive.

* * * * *